Figure 1:
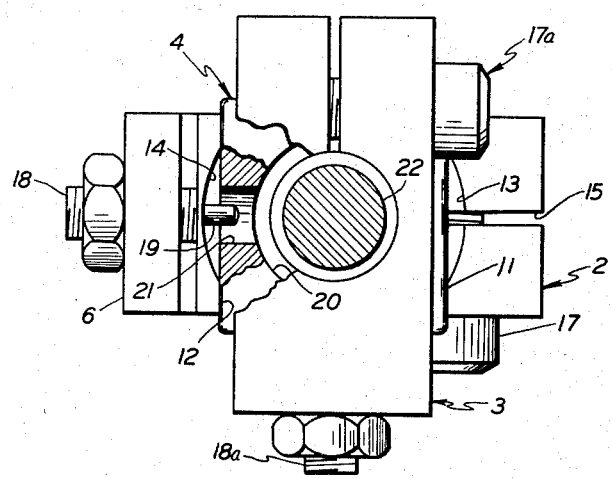

Aug. 6, 1957     E. J. HASNEY     2,801,531
SHAFT COUPLING ASSEMBLY
Filed June 17, 1953

INVENTOR.
EARLE J. HASNEY
BY
Lockwood, Galt, Woodard & Smith
ATTORNEYS

2,801,531

SHAFT COUPLING ASSEMBLY

Earle J. Hasney, Fort Wayne, Ind., assignor to International Telephone and Telegraph Corporation, a corporation of Maryland Application June 17, 1953, Serial No. 362,249

2 Claims. (Cl. 64—6)

The present invention relates to a shaft coupling assembly for securing the adjacent ends of two axially extending rotary shafts together.

In certain types of mechanisms comprised of axially separated rotary coaxial shafts which constitute driving and driven members, respectively, operational necessity requires that any coupling between the two shafts be of such nature as will permit exact conformity of movement therebetween whether the rotation be clockwise or counterclockwise. In other words, the coupling must be of such design as to absolutely prevent "backlash" which may be simply defined as lost motion movement encountered in changing direction of rotation of the driving member, this lost motion allowing relative rotational movement between the two rotary shafts during the change of direction of the driving shaft.

It is, therefore, an object of this invention to provide a rotary shaft coupling for securing the adjacent ends of the driving member and a driven member together, which prevents any relative rotational movement therebetween.

It is another object of this invention to provide a rotary shaft coupling which is adjustable to compensate for manufacturing tolerances and service wear, and which is so arranged as to prevent "backlash."

It is still another object of this invention to provide a rotary shaft coupling for securing adjacent ends of two shafts together, which is economical to manufacture and absolutely reliable in operation. In the accomplishment of this object, a distinct improvement is made over the more expensive prior art couplings which require expensive machining operations such as lapping, grinding, and similar precision manufacturing operations.

Other objects will become apparent as the description proceeds.

To the accomplishment of the above and related objects, my invention may be embodied in the forms illustrated in the accompanying drawings, attention being called to the fact, however, that the drawings are illustrative only, and that specific changes may be made in the specific constructions illustrated and described, so long as the scope of the appended claims is not violated.

Figure 2:
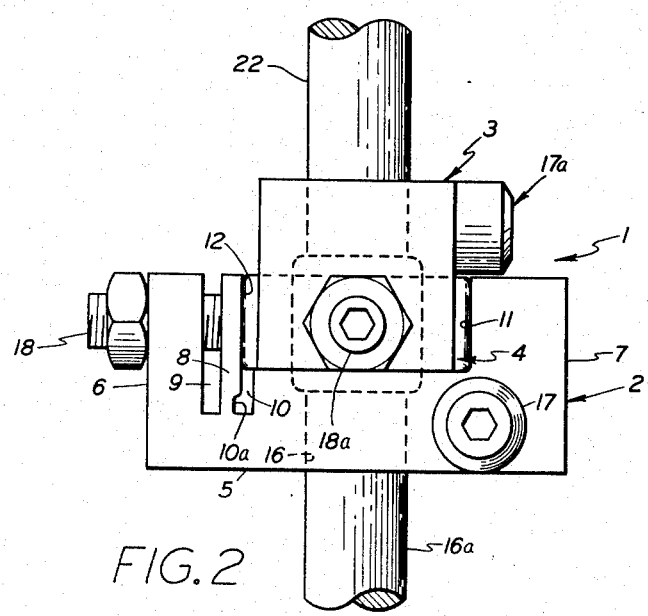

In the drawings:

Fig. 1 is a side elevation of one embodiment of this invention showing the adjacent ends of two axially extending shafts secured together; and Fig. 2 is a plan view thereof shown in part section.

Referring to the drawings, the rotary shaft coupling assembly, generally indicated by the reference numeral 1, is comprised essentially of only three principal parts, with two of these parts being preferably duplicates but not necessarily so as will become apparent from the following description. The assembly is comprised of two coupling members 2 and 3, respectively, which are secured together for simultaneous rotational movement by means of a square bearing block indicated by the reference numeral 4. Since the two clamping members 2 and 3 are identical in the illustrated embodiment of this invention, it is only necessary to describe one, the reference numerals applied to these two members indicating like parts, the reference letter suffix "a" being used in connection with one coupling member to distinguish the details thereof from the corresponding details of the other coupling member. Each coupling member is of substantially U-shaped configuration, having a longitudinally extending base portion 5 and two spaced right angles, upstanding arms 6 and 7, respectively. The arm 6 is machined to provide a spring lug or movable member 8 which is spaced from the main body portion of the coupling member by a machined slot 9, the lug 8 being integral along its lower longitudinal edge with the base member 5 of the coupling member as seen more clearly in Fig. 1. On the opposite side of the lug 8 is machined another slot 10 which extends downwardly a short distance into the base 5 for a purpose which will become apparent from the following description. An undercut 10a which reduces the thickness of the lug base is provided adjacent the bottom of the slot 10.

The internal surface 11 of the arm 7 and the corresponding surface 12 of the lug 8 are formed flat and parallel. In the preferred arrangement, and as one aspect of this invention, each of these surfaces 11 and 12 is provided with an incut radius 13 and 14 respectively intermediate the ends thereof. The arm 7 is further provided with a slot 15 which intersects the internal surface 11. This slot 15 in combination with the shaft opening 16 in the base 5 of the coupling member provides a spring or C clamp for fastening the end of a shaft, such as the one 16a in Fig. 2 to the coupling member 2. A clamping screw 17 extending laterally through the arm 7 provides the shaft-coupling force.

A set screw 18 is threadedly received through the end portion of the arm 6 so as to extend into abutting engagement with the left side of the spring lug 8 as shown. An axially extending projection or nipple 19 on the inner end of the set screw 18 projects through a companion opening in the lug 8 to extend a short distance beyond the internal bearing surface 12. This nipple 19 in combination with other elements of the assembly does not constitute a part of the invention claimed herein, but may be claimed in a copending application by another inventor of the same assignee.

The bearing block 4, in the illustrated arrangement is almost a perfect square, with the lateral sides being flat and parallel. As will become apparent from the following description, while the specific illustrated embodiment comprehends this bearing block as being a perfect square, a rectangular block in which all sides are orthogonally related may be used without departing from the scope of this invention. In the fabrication of this block 4 and the two coupling members 2 and 3, the opposite sides of the block are spaced apart a distance substantially coextensively with the dimension between the internal coupling member surfaces 11 and 12, respectively. Ordinary mass production machining operations may be utilized for forming these surfaces on both the block 4 and the two coupling members 2 and 3. Preferably, the internal surfaces 11 and 12 are made slightly wider in dimension than the spacing between the opposite sides of the block 4 to facilitate mounting of the block 4 between these latter surfaces as is clearly illustrated in the drawings. As seen in Fig. 2, the block 4 is provided with a clearance aperture 20 which is intersected by means of another aperture 21 disposed to surround with suitable substantial clearance the end portion of the set screw nipple 19. Thus with the block 4 mounted on the coupling member 2 and the set screw 18 assembled as shown in Fig. 2, the nipple 19 will prevent the block 4 from falling out of the mounted position during assembling and servicing operations. This is an important feature, since its absence in the assembly and servicing of the overall coupling assembly, nothing is to prevent the block 4 from dropping out of the coupling member. In some intricate mechanisms, if during assembling or disassembling operations the block 4 should be dropped and lost, the entire mechanism would be disabled and this could be quite serious where the mechanism is used in the field and no spare blocks 4 are available. Also, in mass producing the present invention, it is seen that the assembly of the coupling device for shipping purposes is facilitated.

In assembling the coupling, the block 4 is first mounted, on, for example, the coupling between the two internal surfaces 11 and 12, and thereafter the coupling member 3 with its two bearing surfaces is assembled over the two remaining sides of the block 4. The set screws 18 and 18a are turned inwardly a distance sufficient to bring the respective nipples 19 into the clearance openings 21 thereby completing the integrating assembly of the coupling unit.

This coupling unit 1 serves to fasten the adjacent ends of a driving shaft, for example, 16a to a driven shaft 22 by means of the clamping screws 17 and 17a respectively. Since initial manufacturing tolerances provide for some clearance between the block 4 and the coupling member surfaces 11 and 12, the set screw 18 may be turned inwardly an amount sufficient to spring the lug 8 into contact with the adjacent block surface. This contact is so adjusted as to provide a free-sliding fit without clearance between the block and the coupling member. In prior devices which did not use the adjustment of the spring lug 8 of this invention, it was necessary to machine accurately the internal surfaces 11 and 12 of the assembly and the companion surfaces of the block 4 so as to provide for this free-sliding, no-clearance contact for guarding against "backlash" as explained previously.

With the coupling unit 1 so adjusted, and assuming slight axial misalignment between the shafts 16a and 22, the driving shaft 16a will rotationally drive the shaft 22 with the misalignment therebetween being accommodated by the sliding movement of the respective coupling members 2 and 3 along the lateral sides of the bearing block 4.

Further in operation, the radii 13 and 14 in the coupling members serve to provide two-point contacts for the respective engaged sides of the bearing block 4 so that a stable engagement between the block and the coupling members is obtained. This is important in eliminating the "backlash" described previously.

Better understanding of the importance of incut radii 13 and 14 is obtained by considering the absence of radius 13 in coupling arm 7. Now, upon squeezing the clamp portions of this arm together by tightening the screw 17, the opposite ends of the surface 11 will pivot rearwardly leaving the central portion of the surface 11 extending forwardly. Thus the surface 11 instead of being straight and flat is now centrally ridged providing only a point contact on the block 4. This contact will allow the block to tend to wobble and impair the operating characteristics of the coupling.

By providing the radius 13, a spaced two-point contact of the arm 7 on the block 4 is produced which will insure against any tendency of the block to wobble.

The undercut 10a is provided to insure against distortion of the lug 8 during adjustment thereof. This is accomplished by lessening the base thickness of the lug so that any flexing action will occur there rather than along any other portion of the lug.

What is claimed is:

1. A shaft coupling assembly for connecting adjacent ends of axially extending shafts together for simultaneous rotation comprising a first coupling member substantially of U-shaped configuration, the opposite internal surfaces of said first coupling member being flat and parallel, a resilient lug secured to said first coupling member and providing one of said internal surfaces, adjusting means carried by said coupling member for engagement with said lug whereby the latter may be adjusted toward or away from the other internal surface, a bearing member having orthogonally related flat lateral sides and being mounted on said coupling member with two opposite sides thereof being slidably engageable with said two bearing surfaces respectively, and a second coupling member substantially of U-shaped configuration, the opposite internal surfaces of said second coupling member being flat and parallel, a second resilient lug secured to said second coupling member and providing one of the latter's internal surfaces, adjusting means carried by said second coupling member for engagement with the last-mentioned lug whereby the latter may be adjusted toward or away from the other internal surface of said second coupling member, the internal surfaces of said second coupling member being positioned in right angle relation to the internal surfaces of said first coupling member and being slidably engageable with the remaining two sides of said bearing member.

2. A shaft coupling assembly for connecting adjacent ends of axially extending shafts together for simultaneous rotation comprising a first coupling member substantially of U-shaped configuration, the opposite internal surfaces of said first coupling member being parallel, a shaft opening provided in said coupling member, said coupling member being split along a line which intersects said opening thereby providing a clamp for securing the end of a shaft in said opening, each internal surface being incut intermediate its ends, a resilient lug secured to said first coupling member and providing one of said internal surfaces, adjusting means carried by said coupling member for engagement with said lug whereby the latter may be adjusted toward or away from the other internal surface, a bearing member having orthogonally related flat lateral sides and being mounted on said coupling member with two opposite sides thereof being slidably engageable with the ends of the respective bearing surfaces which are disposed on opposite sides of the respective incut portions, and a second coupling member substantially of U-shaped configuration, the opposite internal surfaces of said second coupling member being parallel, a second shaft opening provided in said second coupling member intermediate the internal surfaces of the latter, said second coupling member being split along a line which intersects one internal surface thereby providing a second clamp for securing the end of a second shaft in said second opening, each of the last-mentioned internal surfaces being incut intermediate its ends, a second resilient lug secured to said second coupling member and providing one of the latter's internal surfaces, adjusting means carried by said second coupling member for engagement with the last-mentioned lug whereby the latter may be adjusted toward or away from the other internal surface of said second coupling member, the internal surfaces of said second coupling member being positioned in right angle relation to the internal surfaces of said first coupling member and being slidably engageable with the remaining two sides of said bearing member, each of said internal surfaces having a two-point contact with the respective bearing member side by reason of the incut portion thereof.

References Cited in the file of this patent
UNITED STATES PATENTS 2,007,513    Westburgh _____ July 9, 1935